(12) United States Patent
Ouyang et al.

(10) Patent No.: US 9,824,226 B2
(45) Date of Patent: Nov. 21, 2017

(54) ANTI-THEFT IN FIRMWARE

(71) Applicant: Intel Corporation, Santa Clara, CA (US)

(72) Inventors: Qian Ouyang, Shanghai (CN); Jian J. Wang, Shanghai (CN); Vincent J. Zimmer, Federal Way, WA (US); Michael A. Rothman, Puyallup, WA (US); Chao B. Zhang, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/997,369

(22) PCT Filed: Oct. 25, 2012

(86) PCT No.: PCT/CN2012/083498
§ 371 (c)(1),
(2) Date: Jun. 24, 2013

(87) PCT Pub. No.: WO2014/063330
PCT Pub. Date: May 1, 2014

(65) Prior Publication Data
US 2015/0220742 A1  Aug. 6, 2015

(51) Int. Cl.
*G06F 11/30* (2006.01)
*G06F 21/60* (2013.01)
(Continued)

(52) U.S. Cl.
CPC .......... *G06F 21/602* (2013.01); *G06F 9/4406* (2013.01); *G06F 21/32* (2013.01); *G06F 21/575* (2013.01)

(58) Field of Classification Search
CPC ...... G06F 21/575; G06F 9/4406; G06F 21/31; G06F 21/32; G06F 11/1417; G06F 21/57;
(Continued)

(56) References Cited

U.S. PATENT DOCUMENTS 6,151,678 A * 11/2000 Davis ................... G06F 21/305
714/36
6,687,375 B1 * 2/2004 Matyas, Jr. ........... H04L 9/0866
380/30
(Continued)

FOREIGN PATENT DOCUMENTS

CN       1893713 A    1/2007
CN     101123507 A    2/2008
(Continued)

OTHER PUBLICATIONS

Smith, "Storage Protection with Intel(r) Anti-Theft Technology - Data Protection (Intel(r) AT-d)", Intel Technology Journal, vol. 12, Issue 4, Dec. 23, 2008.
(Continued)

*Primary Examiner* — Farid Homayounmehr
*Assistant Examiner* — Lizbeth Torres-Diaz
(74) *Attorney, Agent, or Firm* — Stoel Rives LLP

(57) ABSTRACT

Methods, systems and storage media are disclosed for enhanced system boot processing that authenticates boot code based on biometric information of the user before loading the boot code to system memory. For at least some embodiments, the biometric authentication augments authentication of boot code based on a unique platform identifier. The enhanced boot code authentication occurs before loading of the operating system, and may be performed during a Unified Extensible Firmware Interface (UEFI) boot sequence. Other embodiments are described and claimed.

12 Claims, 10 Drawing Sheets

(51) Int. Cl.
  *G06F 21/32* (2013.01)
  *G06F 21/57* (2013.01)
  *G06F 9/44* (2006.01)

(58) Field of Classification Search
  CPC . G06F 21/6218; G06F 21/64; H04L 63/0861; H04L 9/3231; H04L 63/10; H04L 63/20; H04L 9/3236
  See application file for complete search history.

(56) References Cited

U.S. PATENT DOCUMENTS

| | | | |
|---|---|---|---|
| 7,073,064 B1* | 7/2006 | Angelo | G06F 21/575 710/10 |
| 7,272,245 B1* | 9/2007 | Layton | G06K 9/0061 340/5.2 |
| 7,299,347 B1* | 11/2007 | Kao | G06F 9/4401 709/220 |
| 7,779,268 B2* | 8/2010 | Draper | G06K 9/00073 713/168 |
| 7,831,839 B2* | 11/2010 | Hatakeyama | G06F 21/51 713/169 |
| 2002/0087877 A1 | 7/2002 | Grawrock | |
| 2003/0070079 A1* | 4/2003 | Cromer | G06F 21/32 713/186 |
| 2005/0216757 A1 | 9/2005 | Gardner | |
| 2006/0064577 A1 | 3/2006 | Chiu et al. | |
| 2007/0011466 A1* | 1/2007 | Imura | G07C 9/00142 713/186 |
| 2008/0263363 A1* | 10/2008 | Jueneman | G06F 21/32 713/184 |
| 2009/0319806 A1* | 12/2009 | Smith | G06F 21/575 713/193 |
| 2010/0023739 A1* | 1/2010 | Levit-Gurevich | G06F 21/575 713/2 |
| 2010/0082968 A1* | 4/2010 | Beverly | G06F 12/1433 713/2 |
| 2010/0169631 A1* | 7/2010 | Yao | G06F 9/44 713/2 |
| 2014/0214687 A1* | 7/2014 | Huxham | H04L 63/10 705/70 |

FOREIGN PATENT DOCUMENTS

| | | |
|---|---|---|
| CN | 102110195 A | 6/2011 |
| EP | 2017765 A2 | 1/2009 |
| JP | 2001144743 A | 5/2001 |
| JP | 2003032243 A | 1/2003 |
| JP | 2005346523 A | 12/2005 |
| JP | 2007018050 A | 1/2007 |
| JP | 2012008951 A | 1/2012 |
| WO | 2006091997 A1 | 9/2006 |
| WO | 2011083343 A2 | 7/2011 |
| WO | 2014/063330 A1 | 5/2014 |

OTHER PUBLICATIONS

Zimmer, "System Isolation Beyond BIOS Using the Unified Extensible Firmware Interface", in Proceedings of the 2008 International Conference on Security and Manageability, SAM '08, CSREA Press, Jun. 2008, 7 pages.

Rothman, "Reducing Platform Boot Times", UEFI-based Performance Optimization, Jun. 2009, pp. 1-25.

Sacco et al., "Deactivate the Rootkit", Black Hat Briefings, Las Vegas, NE, USA, Jul. 30, 2009, abstract only, 5 pages.

Rosenbaum et al., "A Tour Beyond BIOS into UEFI Secure Boot", Intel Corporation, Jul. 2012, 49 pages.

Zimmer et al., "Trusted Platforms", UEFI, PI and TCG-based firmware, Intel/IBM whitepaper, Sep. 2009, 50 pages.

International Search Report and Written Opinion received for PCT patent Application No. PCT/CN2012/083498, dated Aug. 1, 2013, 11 pages.

Sugawara, "Structure and Implementation of next generation BIOS "UEFI"", Information Processing, Japan, Information Processing Society of Japan, vol. 49, No. 12, Dec. 15, 2008, pp. 1460-1463 (No English translation is available).

\* cited by examiner

FIG. 1  *Prior Art*

ANTI-THEFT IN FIRMWARE

BACKGROUND

Relatively portable computing systems, such as tablets, notebooks, laptops, netbooks, ultrabooks, cell phones, smart phones and other handheld devices, are often susceptible to theft. In some cases, the purpose of the theft may be to take ownership of the device for the thief's use, or to sell the device to others. In order to protect against the situation where the thief desires to re-purpose the use of a stolen device, it would be desirable to prevent boot of the device by anybody other than the original owner.

DETAILED DESCRIPTION

Figure 1:
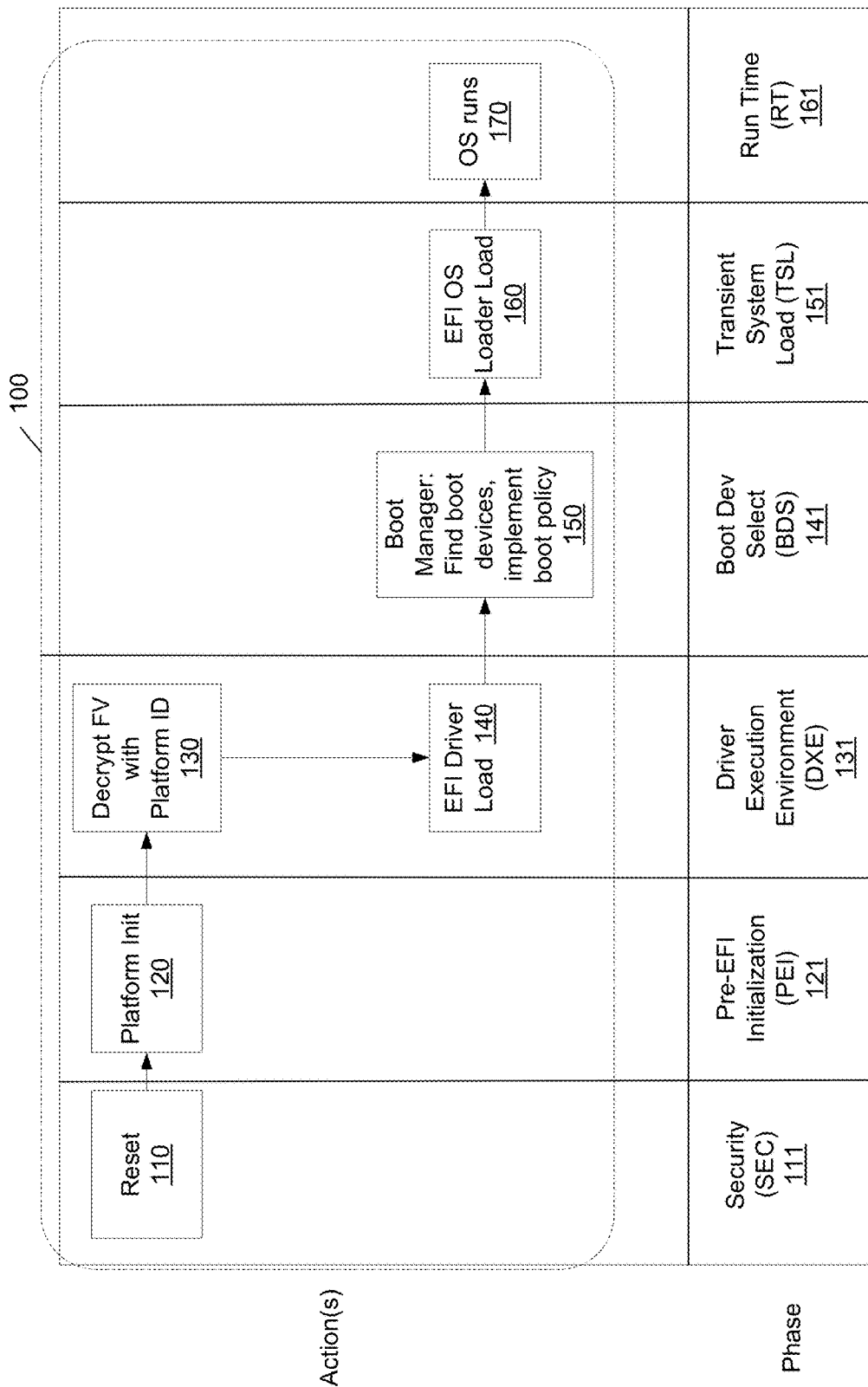
FIG. 1 is a phase diagram illustrating a UEFI boot sequence.

Described embodiments provide anti-theft capabilities in firmware of a computing device. More specifically, biometric information of a user is used to encrypt firmware necessary to boot the operating system (OS) of a processing system. On subsequent boots, the firmware is decrypted during boot using biometric information, such that only the user can boot the system. In this manner, repurposing of a stolen device can be thwarted.

Among current anti-theft technologies, many of them run in the OS environment as a software driver. These technologies may be thwarted on a stolen machine by uninstalling them, reinstalling the OS, or replacing the hard disk with a new one. Other current anti-theft technologies are firmware features. These act similarly to power-on password protection, and may be thwarted by changing a few bytes of firmware code to jump to bypass the authentication processing, or by burning a new copy of firmware to the stolen computing device from another device of the same type.

The embodiments described herein provide advantages over several known security techniques because the embodiments provide a security mechanism that is an inherent feature of the pre-OS firmware of the computing system, and may not be bypassed in the manner that some other security mechanisms may be bypassed.

In order to avoid unauthorized re-purposing of a computing device, embodiments described herein thus address several security breach techniques. For example, one such technique is to hack the ROM (Read Only Memory) of stolen computing device to reinstall a different operating system ("OS"). In computing systems without the embodiments described herein, this may be accomplished, for example, by re-flashing the BIOS image to change the bootloader code so that a different OS is loaded during boot. In this manner, the OS power-on password of the original owner may be bypassed. Embodiments described herein address this type of breach by performing a biometric authentication check in the boot sequence prior to executing the bootloader code.

In computing systems that do not include any of the embodiments described herein, reflashing of the BIOS (Basic Input Output system) image may also be used to bypass security features provided by a separate component of the system instead of by the CPU itself. For example, the BIOS image of a computing device may be re-flashed in order to disable out-of-band security features. Such out-of-band security features may include those, for example, provided by a manageability engine, a trusted platform module ("TPM",) or other standalone security component that is separate from the CPU. As an enhancement over such out of band security features, the embodiments described herein provide encrypted firmware components that prevent booting of the device in case of authentication failure.

Another security breach technique addressed by embodiments described herein is the swapping of memory in the computing system. In other words, in order to bypass encryption of storage on the computing device, an unauthorized user may change or switch out the user-replaceable storage hardware on the computing device. In some cases, the storage may be flash, but alternatively (or in addition) to flash, the replaced storage hardware may be an internal hard drive or other storage medium of the computing system. Embodiments described herein address this type of breach by performing a biometric authentication check in the boot sequence prior to executing the bootloader code, thereby prohibiting unauthorized access to storage media.

Another security breach technique addressed by the embodiments described herein is disabling of security features that are embedded as an agent in an option ROM. See, e.g., Ortega, et. al, "De-Activate the RootKit: Attacks on BIOS Anti-theft Technologies," Black Hat Briefings 2009 USA. Las Vegas, Nebr. Jul. 30, 2009. These features do not run as part of a trusted computing base in the secure pre-OS processing associated with the BIOS of a computing system but instead are loaded during later boot processing of option ROMs provided by third parties. As an enhancement over such ROM-based security features, the embodiments described provide encrypted firmware components that prevent booting of the device in case of authentication failure. Accordingly, unauthorized access to option ROMs is prevented.

Referring now to FIG. 1, shown is a generalized depiction of a method 100 for booting the OS of a computing system. At least one embodiment of the method 100 shown in FIG. 1 corresponds to the Unified Extensible Firmware Interface (UEFI) Specifications, such as UEFI 2.3.1c, which may be found at \*\*\*.uefi.org ("www" replaced with asterisks to avoid live hyperlink) FIG. 1 illustrates that the method 100 begins block 110. At block 110, notification of a platform reset event is received. For at least one embodiment, the platform reset event may be either a power-on event or a warm start event (e.g., such as resumption from low-power states, such as S3 and/or S4 low-power states). The processing of block 110 may correspond generally to a Security (SEC) phase 111 of the UEFI boot sequence. For such embodiments, block 110 includes not only receiving a notification that the reset event has occurred, but also includes performing some preliminary initialization processing. For example, for at least one embodiment, the following preliminary processing may be performed at block 110 in response to the reset event notification: pre-RAM code (such as, e.g., execute in place (XIP) code in non-volatile memory) handles initial CPU initialization to create a temporary stack in the CPU cache.

FIG. 1 illustrates that, after reset processing 110 during the initial Security phase 111, processing proceeds to block 120. At block 120, platform hardware, such as the CPU and other system components, is initialized. For some embodiments, examples of such other components may include any one or more of the following: memory controller hardware, I/O controller hardware, chipset hardware (if a chipset is present), and/or motherboard hardware (if a motherboard is present). For at least one embodiment, the platform initialization at block 120 may correspond to a Pre-EFI Initialization ("PEI") phase 121 of the UEFI boot sequence. For at least one such embodiment, the processing at block 120 includes actions to finalize initialization of the CPU, and also may include discovering the DRAM and discovering whether the reset event received at block 110 was a cold start event or a warm start event (such as resume from a low power mode, e.g., S3/S4 sleep or hibernate mode). If the event was a cold start event, processing proceeds from block 120 to block 130. For some embodiments, if the event was a certain type of warm start event (such as resume from a low power mode, such as S3 power state), processing skips from 120 over the processing at blocks 130, 140, 150 and 160, and proceeds instead to OS resume/vector processing (not shown).

During a driver execution phase (DXE) 131, for at least one embodiment, the method 100 decrypts (see block 130) and loads (see block 140) drivers that are used to initialize the rest of system hardware. The decryption at block 130 is performed because UEFI drivers associated with the DXE phase are encrypted to further the goal of ensuring a secure boot. The DXE stage firmware is decrypted at block 130 using a key based on a platform identifier (see, e.g., platform ID key 180 of FIG. 2). For at least one embodiment, the platform identifier is a unique identifier associated with the computing platform, such as a product serial number, MAC address of Ethernet device, TPM (Trusted Computing Module) key, or the like. For at least one embodiment, the platform identifier has been used by the manufacturer to generate a platform key, and the platform key has been used by the manufacturer to encrypt the firmware to be dispatched during the DXE phase 131. At block 130, this same platform identifier is used during the boot processing 100 to generate a platform ID key (see, e.g., platform ID key 180 of FIG. 2). For at least one embodiment, the platform ID key is generated from the platform identifier by forming a hash of the platform identifier.

The platform ID key is used to decrypt the executable DXE firmware at block 130. Processing then proceeds to block 140. At block 140 the appropriate decrypted drivers are loaded into system memory and dispatched. Processing then proceeds to blocks 150, 160, and 170 for UEFI phases BDS (Boot Dev Select) 141, TSL (Transient System Load) 151, and RT (Run Time) 161, respectively. During one or more of these stages 141, 151, 161, operating system code is loaded from non-volatile storage to volatile system memory. For one embodiment, such loading of OS code occurs at block 160 during TSL phase 151.

Figure 2:
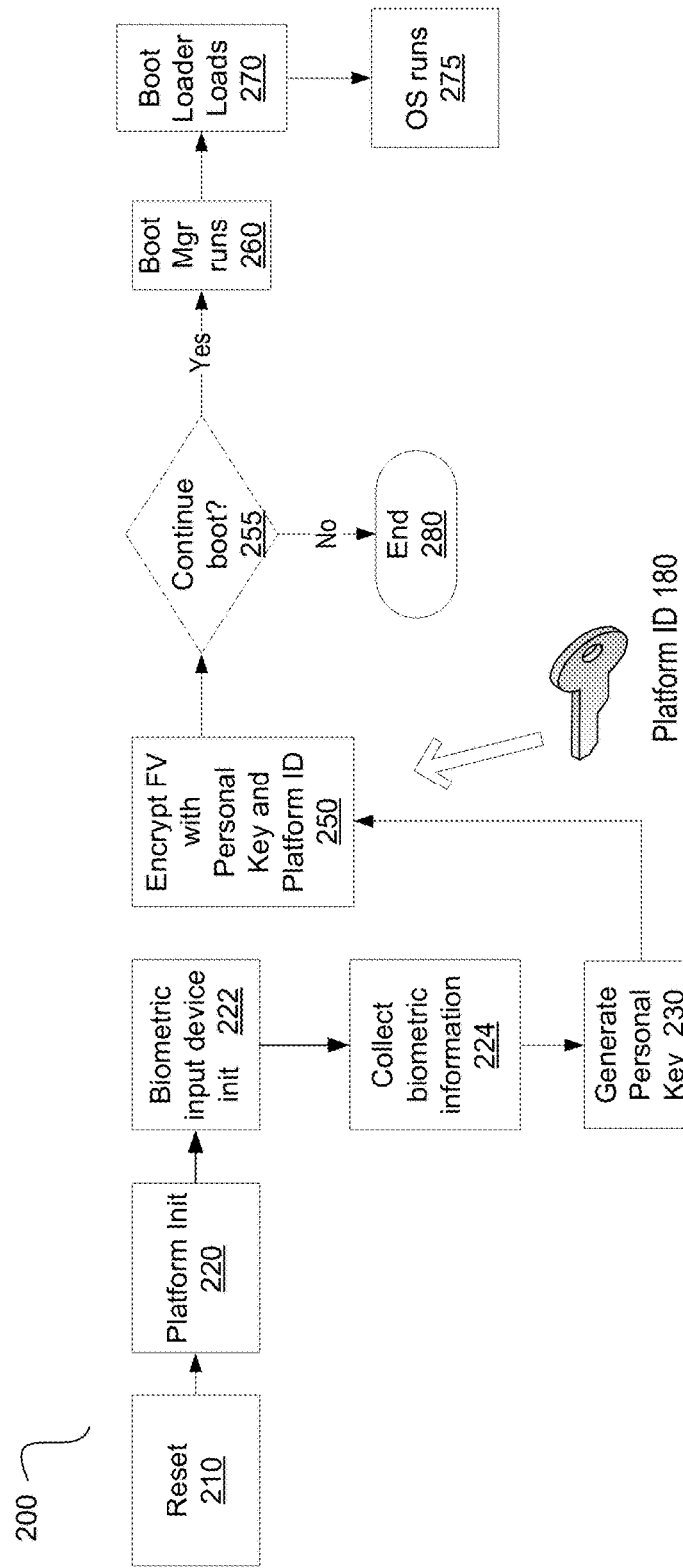
FIG. 2 is a flowchart illustrating at least one embodiment a method for encrypting firmware with biometric information.

FIG. 2 is a flowchart illustrating at least one embodiment of a modified boot method 200. The method 200 includes encrypting of boot firmware instructions with biometric information. In this manner, subsequent boot sequences may include user authentication before loading boot instructions, such as drivers, into memory (e.g., into volatile system memory) for execution.

The method 200 of FIG. 2 may be initiated, for example, upon the user's first boot of a newly-purchased system. For such scenario, the manufacturer of the computing system may have, during manufacture, installed a flash manger that is set to know that the next power-on event should invoke the method 200 of FIG. 2 to initialize the biometric authentication.

Alternatively, the method 200 of FIG. 2 may be initiated by the user, after the initial first-time boot. Such alternative scenario may be invoked, for example, by user selection of biometric authentication initialization via a user-controlled selection mechanism (for example, a control panel or settings option on the computing device). For at least one such embodiment, the user-controlled mechanism is available to initiate biometric authentication if it has not already been enabled (e.g., the manufacturer did not implement default processing to force method 200 to be executed on first-time boot). Otherwise, a user may wish to change previously-initialized authentication information. For such scenario, the user must first provide the old biometric information (processing not shown), before being authorized to proceed to block 222 (discussed below) of the method 200 illustrated in FIG. 2. In other words, the thief of a system cannot bypass the authentication described herein by trying to change the biometric information to his/her own information.

FIG. 2 illustrates that the method 200 begins with reset 210 and platform initialization 220 processing, along the lines of processing 110 and 120, respectively, discussed above in connection with FIG. 1.

From block 220, processing of the method 200 proceeds to block 222. At block 222, one or biometric input device(s) (see, e.g., 602 of FIGS. 6 and 7) is initialized. The device(s) initialized at block 222 may include one or more of the following devices: camera or other facial recognition device, fingerprint scanner, retinal scanner, iris scanner, microphone or other voice scanner, brainwave scanner, DNA analyzer, handprint analyzer, or any other biometric input device. From block 222, processing proceeds to block 224.

At block 224, input from the user is received from the one or more biometric input devices. It should be noted that multiple samples may be received from a single device, such as multiple views of a face, or prints from multiple fingers, or scans from both eyes. In this manner, multi-factor authentication may be supported for the firmware encryption, including multiple readings of the same type (described immediately above) and/or single readings from multiple devices (such as, e.g., combination of retinal scan and voice data for the encryption). The received information may be stored in digitized format. From block 224, processing proceeds to block 230.

At block 230, the digitized biometric information is used to generate a personal key that corresponds to the biometric data of the user. They personal key may be generated at block 230, for example, by generating a hash value based on the digitized biometric information of the user that was collected at block 224. From block 230, processing then proceeds to block 250.

At block 250, executable firmware instructions are encrypted. For at least one embodiment, this is accomplished by encrypting the firmware volume on which DXE phase instructions reside. The encryption at block 250 is performed using the personal key generated at block 230 along with a platform ID key 180 generated from the platform identifier, discussed above. The encrypted instructions may be loaded to into device firmware to overwrite any existing instructions on the firmware volume. From block 250, processing then ends at block 280. For at least one alternative embodiment, processing may proceed from block 250 to optional block 255. The optional nature of block 255 is denoted in FIG. 2 with broken lines.

At block 255, it is determined whether the user wishes to continue with the boot process. If not, processing ends at block 180. Such processing may occur, for example, when the user only wishes to perform initial encryption processing, but does not currently wish to actually boot and use the computing device. The user's wishes may be ascertained at block 255 via any known method, including keyboard input, user screen input, voice input, or the like.

If the user wishes to continue with the boot process, processing proceeds from block 255 to boot processing blocks 260, 270 and 275, in order to load and begin execution of the OS.

Figure 3:
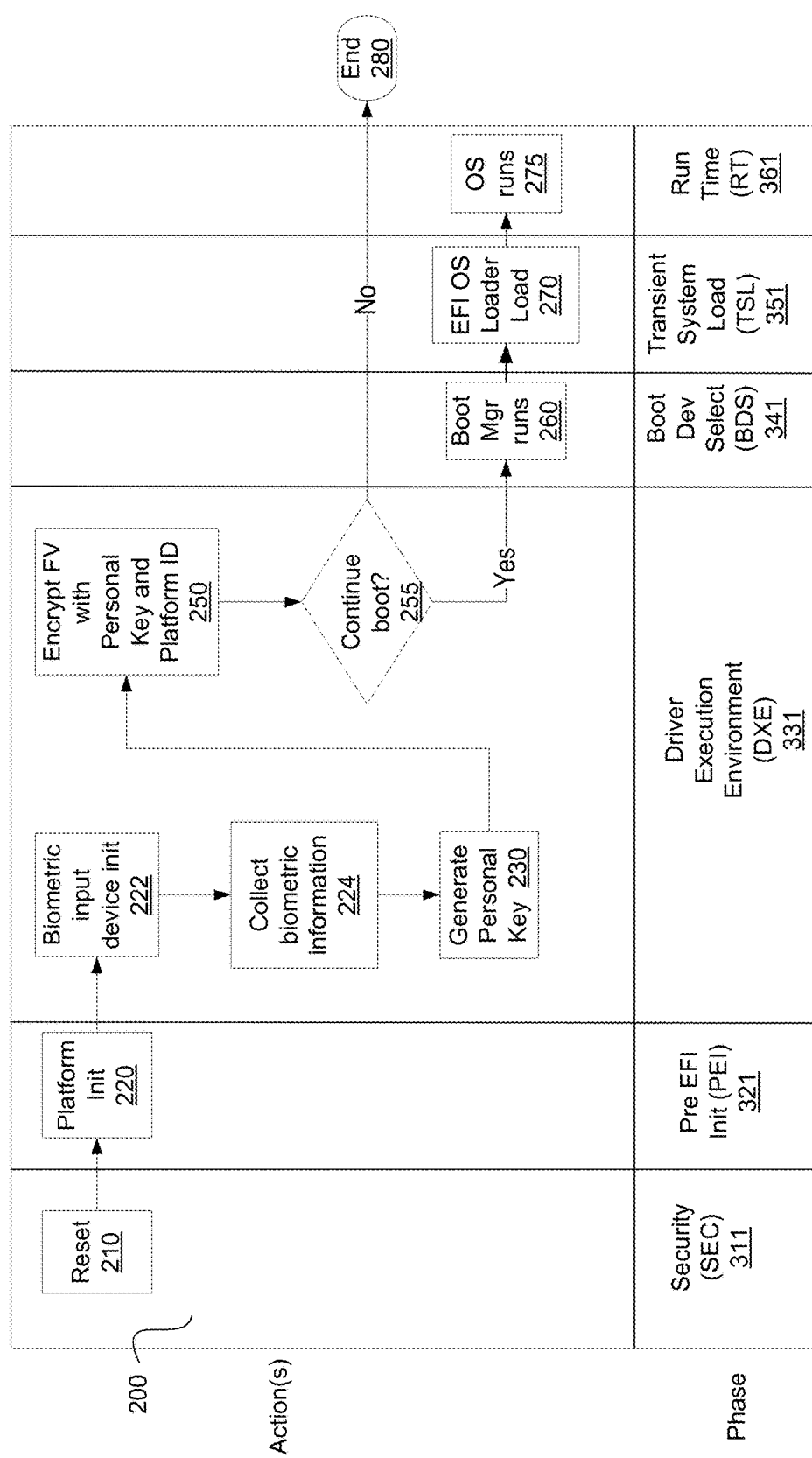
FIG. 3 is phase diagram illustrating at least one embodiment of the method of FIG. 2 during UEFI boot.

The processing of method 200 illustrated in FIG. 2 may be implemented, for at least one embodiment, as part of a UEFI boot process. Turning to FIG. 3, shown is the method 200 of FIG. 2 as applied to the phases 311, 321, 331, 341, 351, 361 of a UEFI boot sequence. FIG. 3 illustrates that the bulk of the method 200 is performed during the DXE phase 331.

In particular, FIG. 3 illustrates that block 210 of method 200 is performed during the SEC phase 311 and that block 220 is performed during the PEI phase 321. From block 220, processing proceeds to block 222.

FIG. 3 illustrates that blocks 222, 224, 230, 250 and 255 are performed during the DXE phase 331. That is, it is during the DXE phase 331 that UEFI firmware is encrypted with a personal key based on biometric information of the user (along with a platform identifier). Processing blocks 260, 270, and 275 are then performed during the BDS phase 341, TSL phase 351, and RT phase 361, respectively, if the determination at block 255 evaluates to a "true" value. Otherwise, processing ends at block 280.

Figure 4:
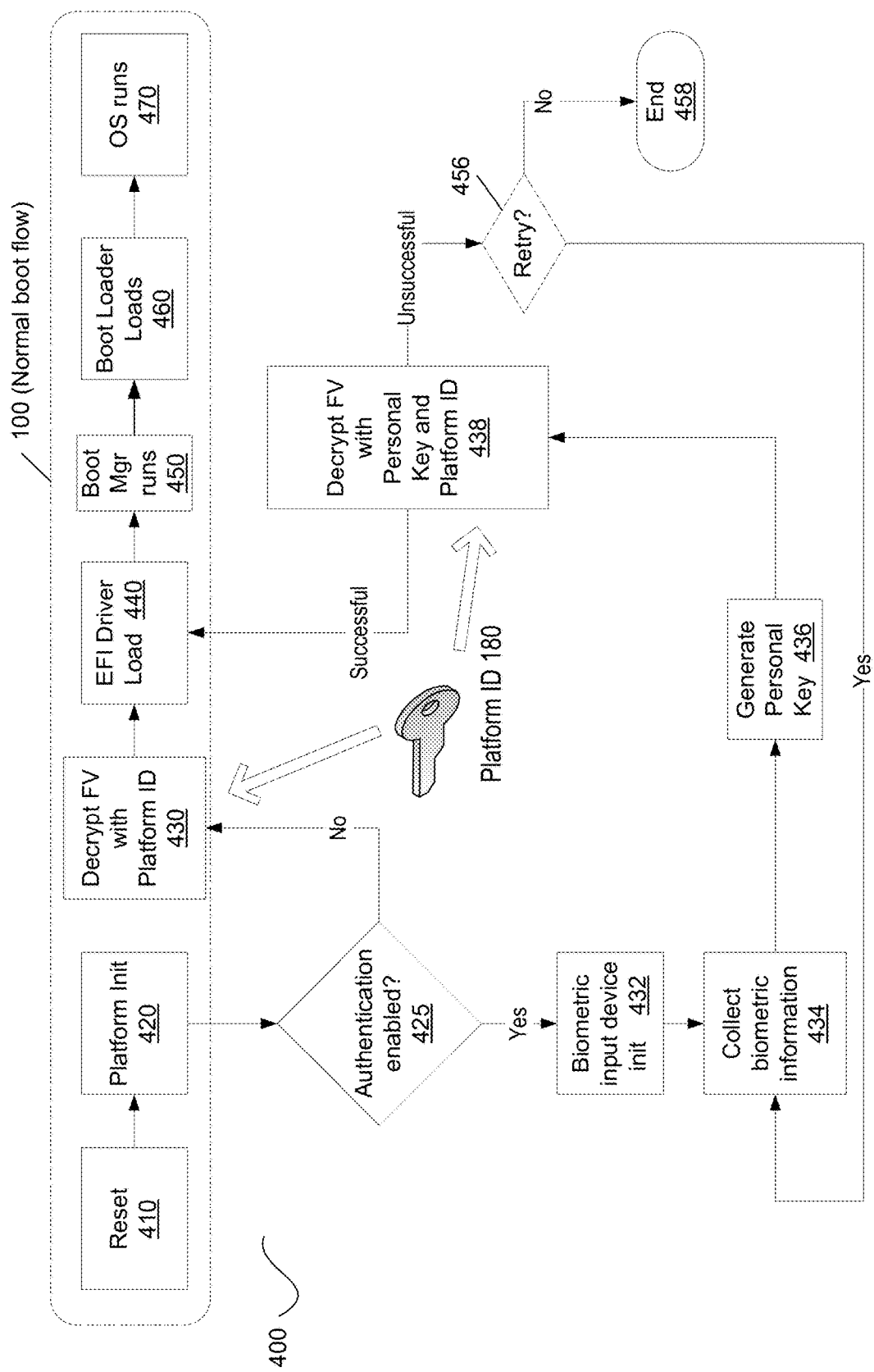
FIG. 4 is a flowchart illustrating at least one embodiment of an enhanced boot process with biometric-based authentication of firmware.

FIG. 4 is a flowchart illustrating at least one embodiment of an enhanced boot process with biometric-based decryption of firmware. For at least one embodiment, it is assumed that the method 400 of FIG. 4 is performed on a computing system on which method 200 of FIG. 2 has already been performed. That is, FIG. 4 illustrates a method of decrypting firmware, using biometric information of a user, after the method 200 illustrated in FIG. 2 has already been performed on the system to encrypt the firmware using biometric information of the user. In such manner, the method 400 may be used to authenticate boot instructions, such as drivers, before such drivers are loaded into memory (e.g., loaded into volatile system memory) for execution during the boot sequence.

FIG. 4 illustrates that the method 400 includes several processing blocks 410, 420, 430, 440, 450, 460, 470 that proceed along the lines of those described above in connection with the method 100 of FIG. 1 (110, 120, 130, 140, 150, 160, 170 respectively). However, FIG. 4 illustrates that the normal boot sequence 100 has been enhanced to take into account biometric decryption. Thus, FIG. 4 illustrates that, at block 425, it is determined whether enhanced biometric authentication has been enabled for the device. That is, for some embodiments, the user may have previously chosen to forgo such encryption on the instant system. Similarly, the manufacturer may have chosen to disable the feature. In such case, processing proceeds to block 430. It should be noted that, if the evaluation at block 430 evaluates to a "false" value, then the processing blocks executed for the method 400 shown in FIG. 4 correspond to the normal boot sequence (e.g., 110, 120, 130, 140, 150, 160, 170) illustrated in FIG. 1. On the other hand, if the evaluation at block 425 evaluates to a "true" value, then processing proceeds to block 432 in order to begin biometric decryption processing.

At block 432, biometric input devices are initialized. For at least one embodiment, the processing of block 432 proceeds along the lines of the processing of block 222 described above in connection with FIG. 2. Processing then proceeds from block 432 to block 434. At block 434, biometric information of the user is collected. For at least one embodiment, the processing of block 434 proceeds along the lines of the processing of block 224 discussed above in connection with FIG. 2. Processing then proceeds to block 436.

At block 436, a personal key is generated based on the biometric information collected at block 434. Again, the processing for at least one embodiment of block 436 proceeds along the lines of that of block 230, discussed above in connection with FIG. 2. Processing then proceeds from block 436 to block 438.

At block 438, the previously-encrypted firmware volume (see FIG. 2) is decrypted using the personal key generated at block 436. For at least one embodiment, the decryption is based on the platform ID key 180 as well as the personal key. For at least one other embodiment, the encryption may be based on additional information. Such additional information may include other factors such as password(s) or passphrase(s) ("what you know"), a token, such as a USB dongle, smart card or other device ("what you have"), and/or location information, such as GPS data or geofencing data ("where you are"). For at least one embodiment, any such additional information may be captured as an additional key to be used for decryption along with (or instead of) the biometric personal key. For at least one other embodiment, the additional information may be included in the personal key. For any of these embodiments, it is to be understood that the user-based information (including biometric data, as well as optional "what you know", "what you have", and "where you are" data) used for the encryption at block 438 was also previously used for the encryption performed at block 250 of FIG. 2.

FIG. 4 illustrates that, due to the processing at blocks 432, 434, 436 and 438, the firmware volume cannot be decrypted during the boot process without the physical presence of the user. In this manner, the computing system cannot boot the OS without the physical presence of the user, making the device useless if it has been stolen. In addition, because the encryption/decryption illustrated at blocks 250 (FIG. 2) and 438 (FIG. 4) also use the platform ID key, additional security is maintained. That is, the user of a first computing system cannot burn a copy of firmware from a second computing system into first computing system, even if the user owns both systems. This is due to the fact that the platform identifier is unique among computer systems.

If the decryption operation at block 438 is successful, normal boot processing is performed at blocks 440, 450, 460 and 470.

However, if the decryption operation is not successful, processing ends at block 458. Before ending, however, optional block 456 may be performed. At block 456, it is determined whether the decryption should be re-attempted. Such determination may be based on a default setting, or may be based on selection input solicited from the user. In any event, if retry is to be performed, processing proceeds to block 434 so that biometric information may be collected for an additional decryption attempt.

Figure 5:
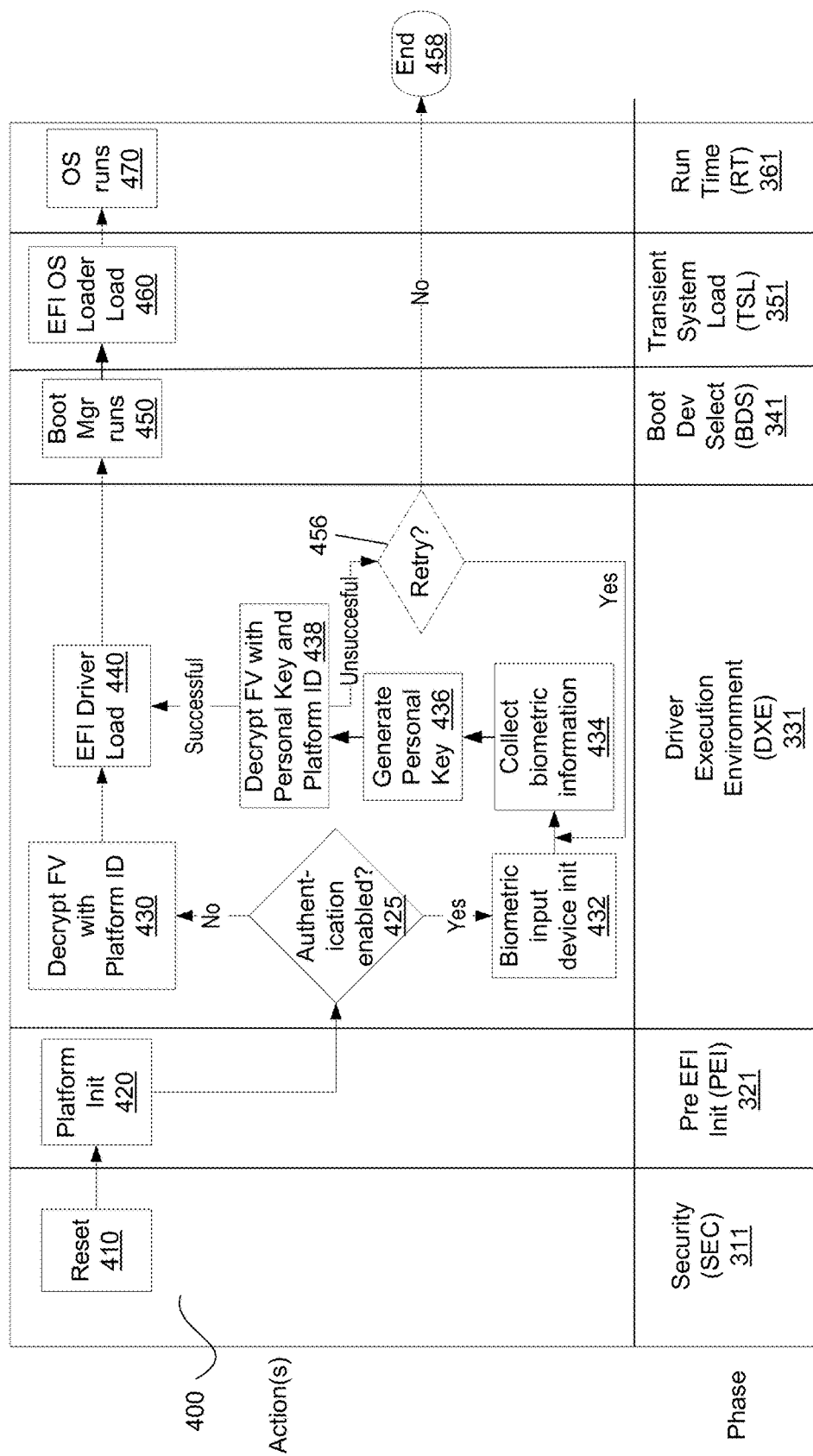
FIG. 5 is a phase diagram illustrating at least one embodiment of the method of FIG. 4 during UEFI boot.

The processing of method 400 illustrated in FIG. 4 may be implemented, for at least one embodiment, as part of a UEFI boot process. Turning to FIG. 5, shown is the method 400 of FIG. 4 as applied to the phases 311, 321, 331, 341, 351, 361 of a UEFI boot sequence. FIG. 5 illustrates that the bulk of the method 400 is performed during the DXE phase 331.

In particular, FIG. 5 illustrates that block 410 of method 400 is performed during the SEC phase 311 and that block 420 is performed during the PEI phase 321. From block 420, processing proceeds to block 425.

FIG. 5 illustrates that blocks 425, 430, 432, 434, 436, 438, and 440, as well as optional block 456, are performed during the DXE phase 331. That is, it is during the DXE phase 331 that UEFI firmware is decrypted using biometric information of the user (along with platform identifier). Processing blocks 450, 460, and 470 are then performed during the BDS phase 341, TSL phase 351, and RT phase 361, respectively, if the determination at block 456 evaluates to a "true" value. Otherwise, processing ends at block 458.

Figure 6:
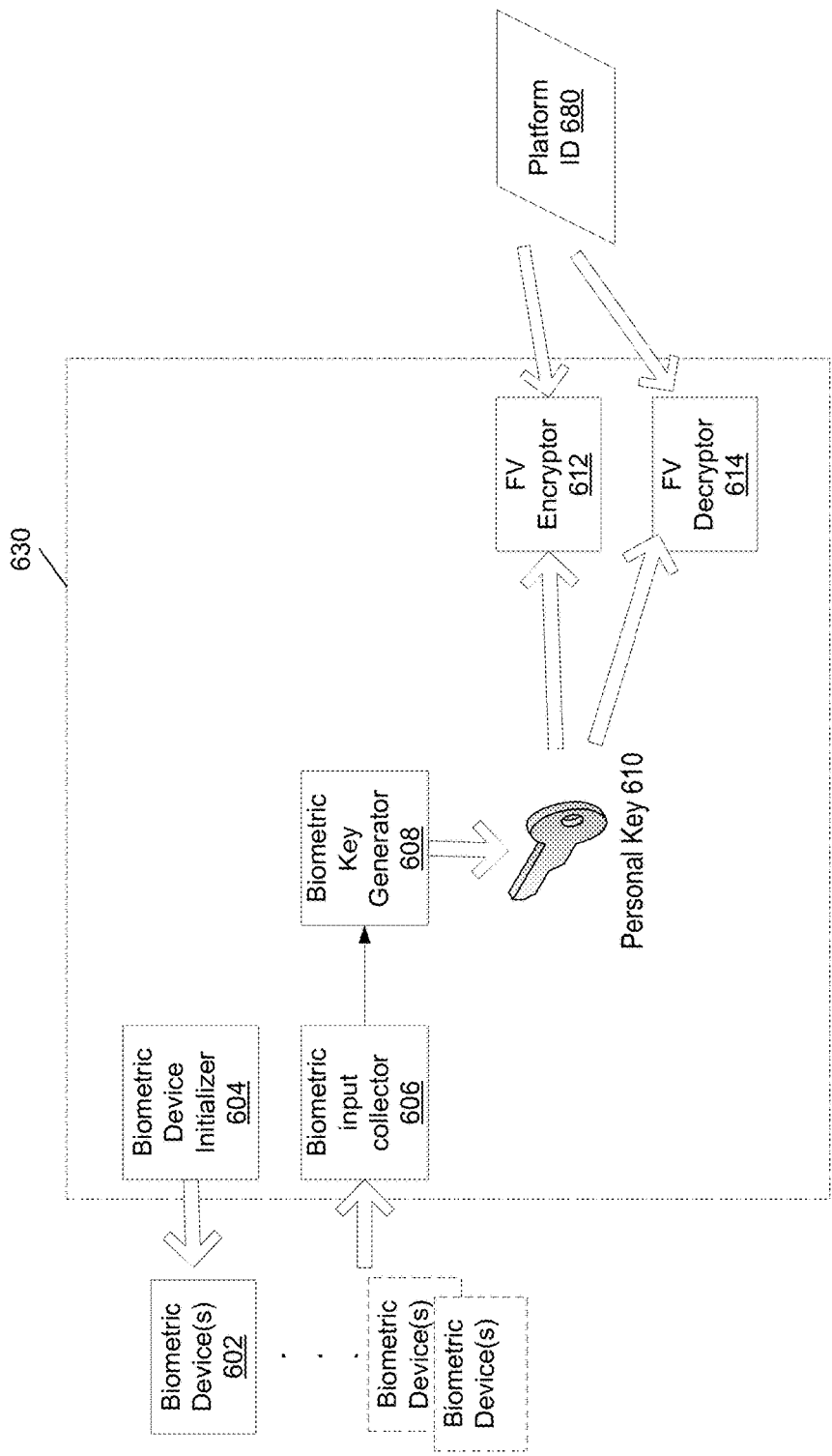
FIG. 6 is a block diagram illustrating firmware modules for performing at least one embodiment of biometric authentication of firmware during boot.

FIG. 6 is a block diagram illustrating modules 630 and other system elements for performing at least embodiment of biometric authentication of firmware during boot. For example, modules 630 may include instructions to perform embodiments of the encryption blocks 222, 224, 230, 250 illustrated in FIGS. 2 and 3, and may also include instructions to perform embodiments of the decryption blocks 430, 432, 434, 436, 438 illustrated in FIGS. 4 and 5. Accordingly, embodiments of the invention include machine-accessible storage media containing instructions for performing the operations discussed herein. Such embodiments may also be referred to as computer program products.

FIG. 6 illustrates that the modules 630 include at least one or more of the following: a device initializer 604, an input collector 606, a key generator 608, an encryptor module 612, and a decryptor module 614. For at least one embodiment, such modules 630 are firmware modules stored in Read Only Memory (ROM) of a computing device and executed during the boot process before the OS is loaded. For example, one or more instructions of the device analyzer 604 may be executed during boot to perform the processing of block 222 shown in FIGS. 2 and 3, and to perform the processing of block 432 shown in FIGS. 4 and 5. One or more instructions of the input collector 606 may be executed to perform the processing of block 224 shown in FIGS. 1 and 3, and to perform the processing of block 434 shown in FIGS. 4 and 5. One or more instructions of the key generator 608 may be executed to perform the processing to generate a personal key 610, as shown at block 230 of FIGS. 2 and 3 and at block 436 shown in FIGS. 4 and 5.

One or more instructions of the encryptor module 612 may be executed to encrypt boot instructions as described in connection with block 250 shown in FIGS. 2 and 3. For at least one embodiment, the encryption processing 250 performed by the encryptor module 612 may be applied to a firmware volume that contains UEFI driver instructions.

One or more instructions of the decryptor module 614 may be executed to decrypt boot instructions as described in connection with block 438 shown in FIGS. 4 and 5. For at least one embodiment, the encryption processing 438 performed by the decryptor module 614 may be applied to a firmware volume that contains UEFI driver instructions.

FIG. 6 further illustrates that the modules 630 may be applied to input data to perform the functions described herein and to generate output information. Accordingly, one or more of the modules 630 may receive input from other components of the computing system. For example, FIG. 6 illustrates that the encryptor module 612 and decryptor module 614 may both receive the platform ID 680 from the computing system.

The input collector 606 may receive biometric information from one or more biometric device(s) 620. The optional nature of additional biometric devices is denoted in FIG. 6 with broken lines. For at least one embodiment, biometric devices may include one or more of any or all of the following: camera or other facial recognition device, fingerprint scanner, retinal scanner, iris scanner, microphone or other voice scanner, brainwave scanner, DNA analyzer, handprint analyzer, or any other biometric input device.

One or more of the modules 630 may provide output data or signals to other components of the computing system. For example, FIG. 6 illustrates that the device initializer 604 may provide initialization signals and/or data to one or more biometric device(s) 602. Also, the key generator module 608 may generate a key 610 based at least in part on biometric data of the user, and may provide such key 610 to other modules such as the encryptor module 612 and the decryptor module 614.

Although discussed as herein primarily as ROM firmware instructions, embodiments of the modules 630 disclosed herein may be implemented in hardware, software, firmware, or a combination of such implementation approaches. Embodiments may be implemented as computer instructions executing on programmable systems comprising at least one processor, a data storage system (including volatile and/or non-volatile memory and/or storage elements), at least one input device (such as a keyboard, touchscreen or the like), and at least one output device (such as an integral display screen or a peripheral display device, such as monitor).

Such machine-accessible storage media may include, without limitation, tangible non-transitory arrangements of particles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Figure 7:
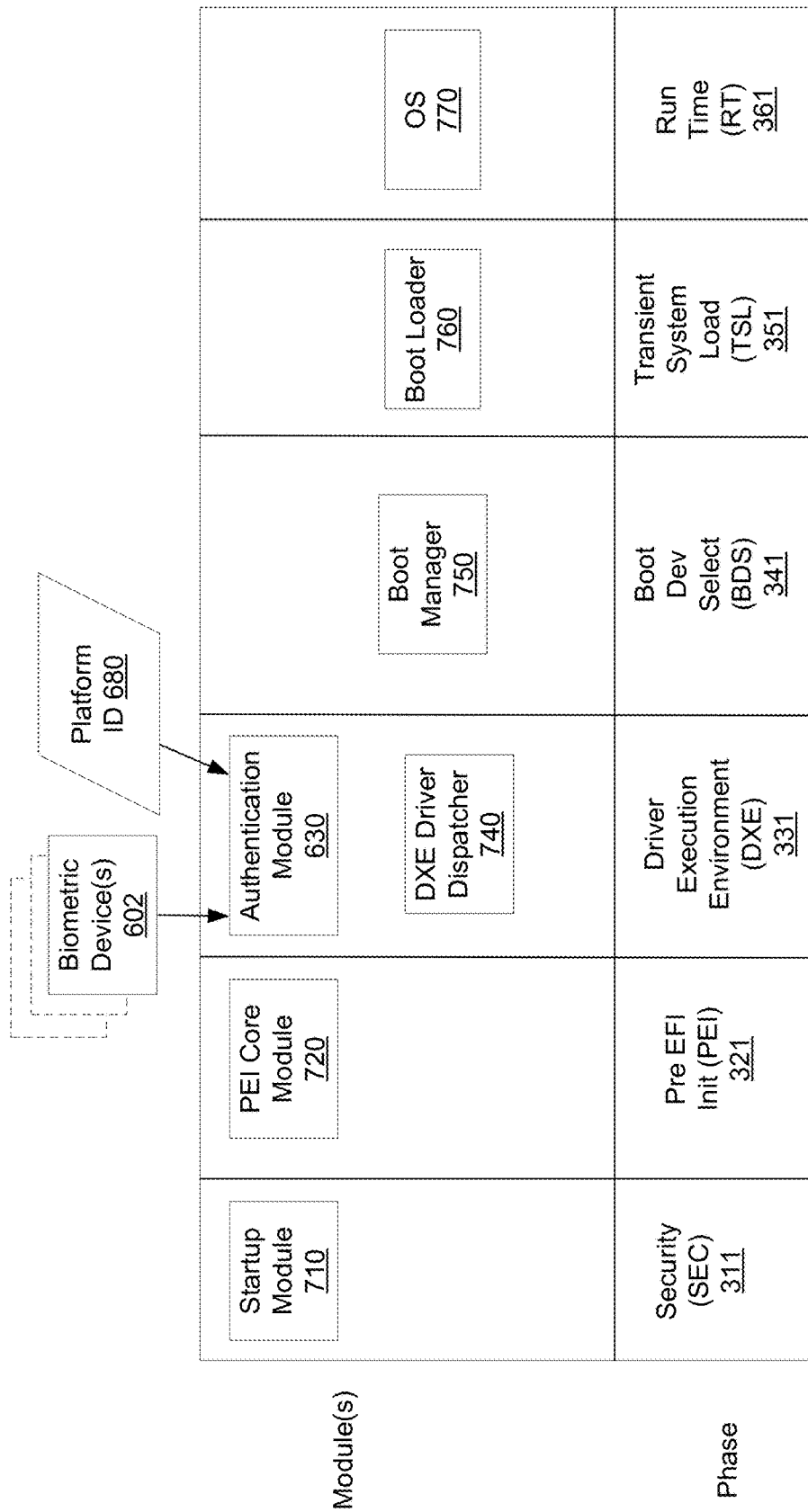
FIG. 7 is a phase diagram illustrating functional firmware and software modules to perform biometric encryption and decryption of firmware during UEFI boot.

The modules 630 illustrated in FIG. 6 may be executed, for at least one embodiment, as part of a UEFI boot process. Turning to FIG. 7, shown is a phase diagram illustrating functional firmware and software modules to perform biometric-based authentication of firmware during UEFI boot. FIG. 7 illustrates a Startup Module 710 and a PEI Core Module 720. Startup Module 710 may be executed, for at least one embodiment, to perform the processing of blocks 110, 210, and 410 as discussed above in connection with FIGS. 1, 2 & 3, and 4 & 5, respectively. Such processing may be performed during the SEC phase 311 of the UEFI boot sequence.

Similarly, PEI Core Module 720 may be executed, for at least one embodiment, to perform the processing of blocks 120, 220, and 420 as discussed above in connection with FIGS. 1, 2 &3, and 4 & 5, respectively. Such processing may be performed during the PEI phase 321 of the UEFI boot sequence.

FIG. 7 also illustrates Authentication Module 630. The Authentication Module 630 may receive various inputs, including biometric data from one or more biometric device(s) 620, and also a platform identifier. Authentication Module 630 may be executed, as discussed above in connection with FIG. 6, to perform biometric authentication of firmware drivers to be executed during the boot process. Such processing may be performed during the DXE phase 331 of the UEFI boot sequence.

FIG. 7 also illustrates additional modules 740, 750, 760, 770 to be executed during phases 331, 341, 351, and 361, respectively, of the OS boot process. Such modules may include firmware modules, but also may include software programs. For example, the OS 770 may be implemented as a software program rather than as firmware instructions.

Any of the modules implemented as software programs (e.g., 770) may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Figure 8:
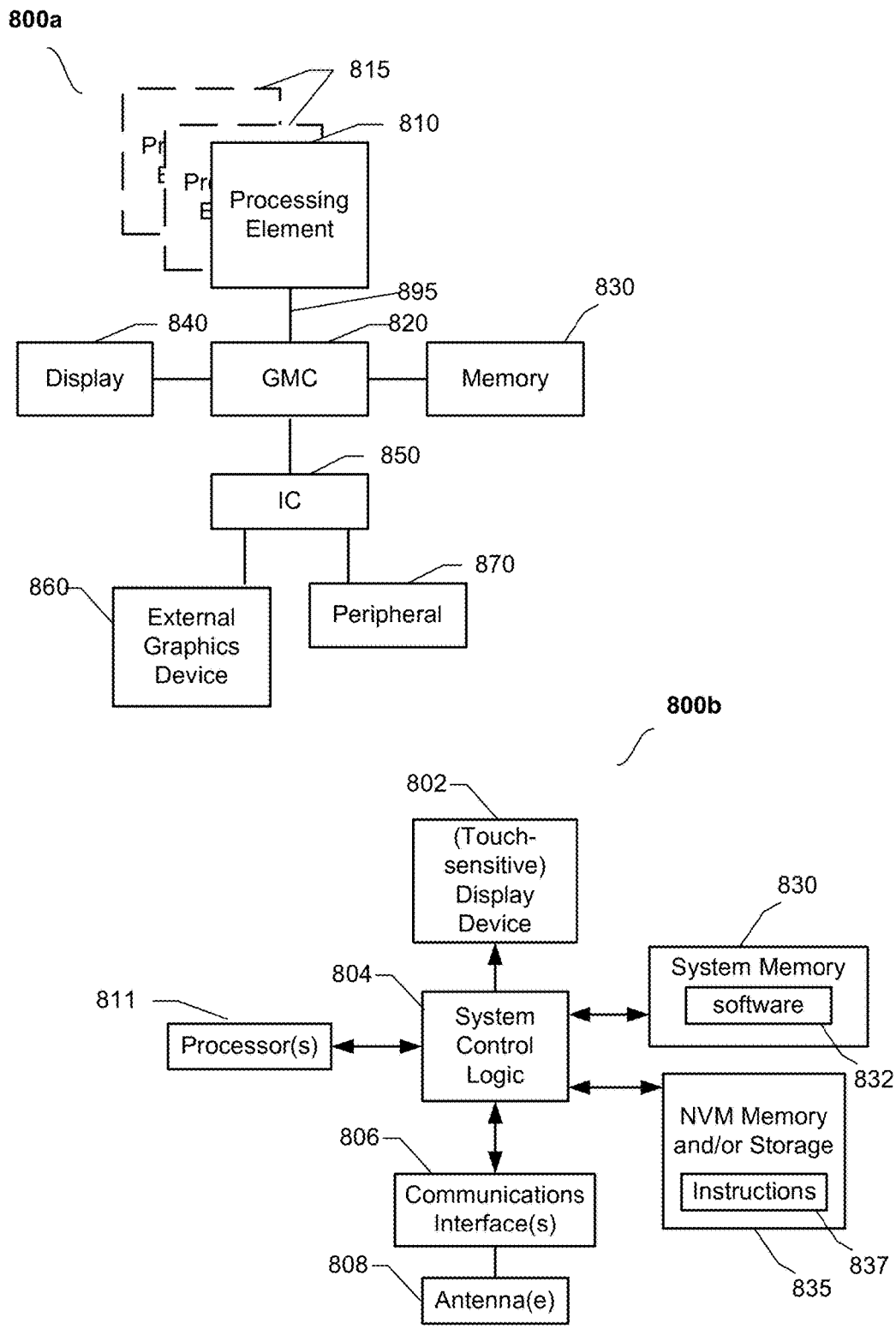
FIG. 8 is a block diagram illustrated first and second systems in accordance with at least one embodiment of the present invention.

Referring now to FIG. 8, shown are block diagrams of a first system 800a and a second system 800b, each of which may perform embodiments of the enhanced boot processing described above. For purposes of this application, a processing system includes any system that has a processor, such as, for example; a digital signal processor (DSP), a microcontroller, an application specific integrated circuit (ASIC), a graphics processing unit, or a microprocessor.

As shown in FIG. 8, the first system 800a may include one or more processing elements 810, 815, which are coupled to graphics memory controller logic (GMC) 820. The optional nature of additional processing elements 815 is denoted in FIG. 8 with broken lines.

Each processing element 810, 815 may be a single core or may, alternatively, include multiple cores. The processing elements 810, 815 may, optionally, include other on-die elements besides processing cores, such as integrated memory controller and/or integrated I/O control logic. Also, for at least one embodiment of the first system 800a, the core(s) of the processing elements 810, 815 may be multi-threaded in that they may include more than one hardware thread context per core.

FIG. 8 illustrates that the GMC 820 may be coupled to a memory 830 that may be, for example, a dynamic random access memory (DRAM). For at least some embodiments, the GMC 820 may be a chipset, or a portion of a chipset. Alternatively, the controller logic of the GMC may be integrated with other components of the system such as, for example, in a system-on-a-chip (SOC) configuration. The GMC 820 may communicate with the processor(s) 810, 815 and control interaction between the processor(s) 810, 815 and memory 830.

The GMC 820 may also act as an accelerated bus interface between the processor(s) 810, 815 and other elements of the system 800a. For at least one embodiment, the GMC 820 communicates with the processor(s) 810, 815 via a multi-drop bus, such as a frontside bus (FSB) 895. For other embodiments (see, e.g., FIGS. 9 and 10), the GMC 820 communicates with the processors(s) 810, 815 via a point-to-point interconnect.

Furthermore, GMC 820 is coupled to a display 840 (such as, e.g., a flat panel display or touch-sensitive display). GMC 820 may include an integrated graphics accelerator. GMC 820 is further coupled to input/output (I/O) controller logic (IC) 850, which may be used to couple various peripheral devices to system 800a. Shown for example is an external graphics device 860, which may be a discrete graphics device, coupled to IC 850, along with other peripheral device(s) 870, such as one or more keyboard, mouse, or numeric keypad.

Alternatively, additional or different processing elements may also be present in the first system 800a. For example, any of the features discussed immediately below in connection with the second system embodiment 800b may be included in the first system 800a. Also, additional processing element(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processing element. There can be a variety of differences between the physical resources 810, 815 in terms of a spectrum of metrics of merit including architectural, micro-architectural, thermal, power consumption characteristics, and the like. These differences may effectively manifest themselves as asymmetry and heterogeneity amongst the processing elements 810, 815. For at least one embodiment, the various processing elements 810, 815 may reside in the same die package.

FIG. 8 also illustrates that the second system 800b may include one or more processing elements 811. As with the first system 800a illustrated in FIG. 8, system 800b is an electronic device that may be implemented using any suitable hardware and/or software to configure electronic device 800b as desired. FIG. 8 illustrates that, for one embodiment, an example system 800b includes a touch-sensitive display device 802 and one or more processors 811 coupled to system control logic 804. The example system 800b may also include system memory 830 coupled to system control logic 804. System control logic 804 may also be coupled to non-volatile memory and/or storage device(s) 835 and may also be coupled to one or more communications interfaces 806.

Touch-sensitive display device 802 (also referred to herein as a "touchscreen") may be implemented using any suitable touch-sensitive technology such as, for example and without limitation, capacitive, resistive, surface acoustic wave (SAW), infrared, and optical imaging. The touch-sensitive technology used for touch-sensitive display device 802 for one embodiment may not require actual touching over its surface, but rather may sense the presence of an object near the surface. Such technology may nevertheless be considered touch-sensitive because such technology will similarly sense an object that actually touches over the surface of the display device 802 and because such surface is likely to be actually touched when electronic device 800b is used. Touch-sensitive display device 802 for one embodiment may be implemented using any suitable multi-touch technology. Touch-sensitive display device 802 includes a display that may be implemented using any suitable display technology, such as that for a liquid crystal display (LCD) for example. System control logic 804 for at least one embodiment may include one or more graphics controllers to provide one or more display interfaces to touch-sensitive display device 802.

System control logic 804 for at least one embodiment may include any suitable interface controllers to provide for any suitable interface to at least one processor 811 and/or to any suitable device or component in communication with system control logic 804.

System control logic 804 for at least one embodiment may include one or more memory controllers to provide an interface to system memory 830. System memory 830 may be used to load and store data and/or instructions, for example, during operation of system 800b. For at least one embodiment, system memory 830 may be used to store any suitable software 832, such as any suitable driver software, application software, and/or operating system software (see, e.g., operating system 770 of FIG. 7). System memory 830 for one embodiment may include any suitable volatile memory, such as suitable dynamic random access memory (DRAM) for example.

System control logic 804 for at least one embodiment may include one or more input/output (I/O) controllers to provide an interface to touch-sensitive display device 802, non-volatile memory and/or storage device(s) 835, and/or communications interface(s) 806.

Non-volatile memory and/or storage device(s) 835 may be used to store data and/or instructions 837. For example non-volatile memory and/or storage device(s) 835 may store firmware modules along the lines of modules 604, 606, 6089, 612, 614 illustrated in FIG. 6. For such embodiments, instructions 837 may correspond to Authentication Module 630 illustrated in FIGS. 6 and 7.

Non-volatile memory and/or storage device(s) 835 may include any suitable non-volatile memory, such as flash memory for example, and/or may include any suitable non-volatile storage device(s), such as one or more hard disk drives (HDDs), one or more compact disc (CD) drives, and/or one or more digital versatile disc (DVD) drives for example. Non-volatile memory and/or storage device(s) 835 may include, for at least one embodiment, non-volatile Read-Only Memory (ROM) that stores instructions for boot processing (see, e.g., modules 630 of FIG. 6 and the boot processing of FIGS. 1, 2, 3, 4 and 5).

Communications interface(s) 806 may provide an interface for system 800b to communicate over one or more networks and/or with any other suitable device. Communications interface(s) 806 may include any suitable hardware and/or firmware. Communications interface(s) 806 for one embodiment may include, for example, a network adapter, a wireless network adapter, a telephone modem, and/or a wireless modem. For wireless communications, communications interface(s) 806 for one embodiment may use one or more antennas 808.

System control logic 804 for at least one embodiment may include one or more input/output (I/O) controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one embodiment, at least one processor 811 may be packaged together with logic for one or more controllers of system control logic 804. For one embodiment, at least one processor 811 may be packaged together with logic for one or more controllers of system control logic 804 to form a System in Package (SiP). For one embodiment, at least one processor 811 may be integrated on the same die with logic for one or more controllers of system control logic 804. For one embodiment, at least one processor 811 may be integrated on the same die with logic for one or more controllers of system control logic 804 to form a System on Chip (SoC).

Although described for one embodiment as being used in system 800b, touch touch-sensitive display device 802 for other embodiments may be used in other system configurations.

Figure 9:
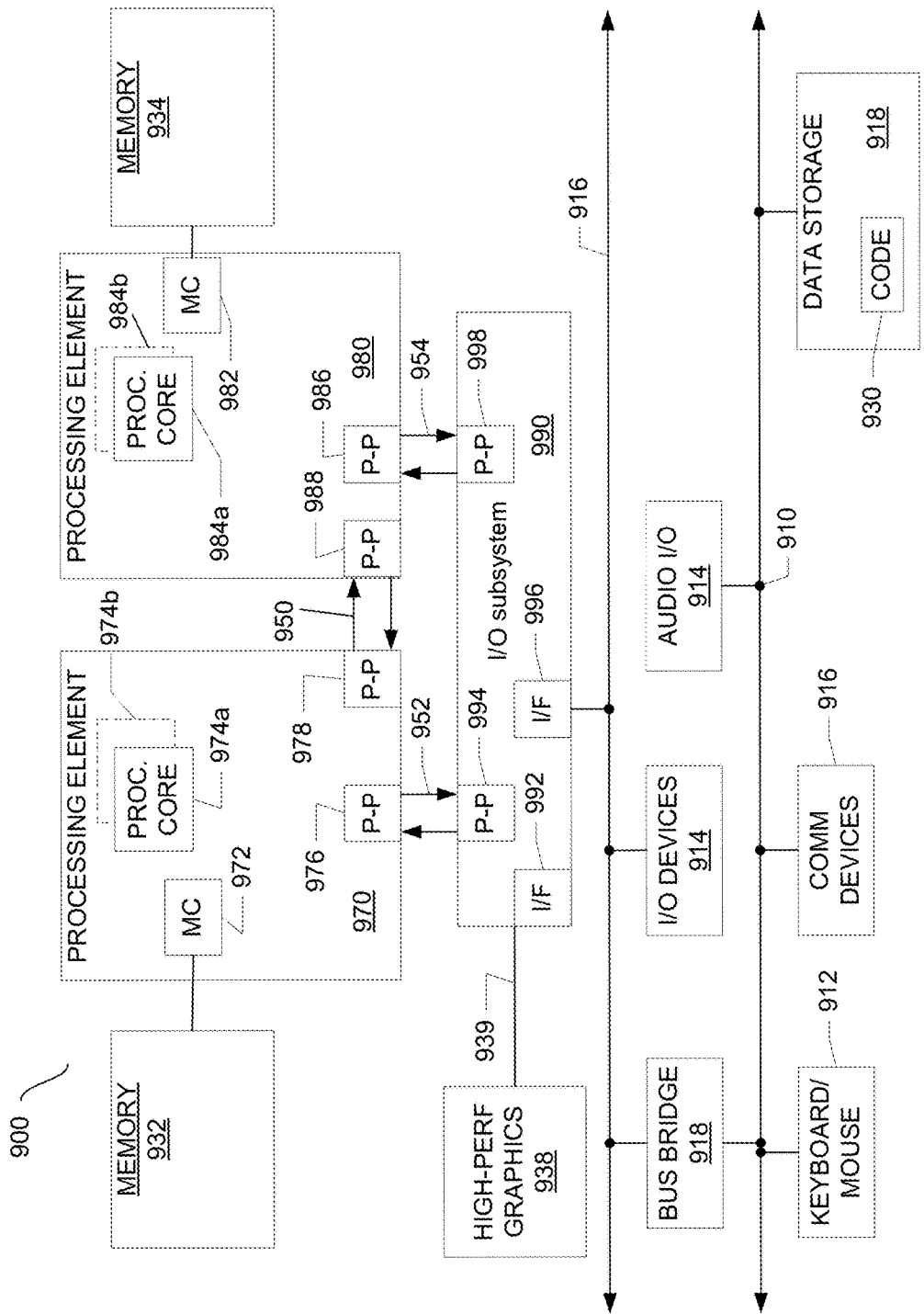
FIG. 9 is a block diagram of a system in accordance with at least one other embodiment of the present invention.

Referring now to FIG. 9, shown is a block diagram of a third system embodiment 900 in accordance with an embodiment of the present invention. As shown in FIG. 9, multiprocessor system 900 is a point-to-point interconnect system, and includes a first processing element 970 and a second processing element 980 coupled via a point-to-point interconnect 950. As shown in FIG. 9, each of processing elements 970 and 980 may be multicore processors, including first and second processor cores (i.e., processor cores 974a and 974b and processor cores 984a and 984b).

Alternatively, one or more of processing elements 970, 980 may be an element other than a processor, such as an accelerator or a field programmable gate array.

While shown with only two processing elements 970, 980, it is to be understood that the scope of the appended claims is not so limited. In other embodiments, one or more additional processing elements may be present in a given processor.

First processing element 970 may further include a memory controller logic (MC) 972 and point-to-point (P-P) interfaces 976 and 978. Similarly, second processing element 980 may include a MCH 982 and P-P interfaces 986 and 988. As shown in FIG. 9, memory controller logic 972 and 982 couple the processors to respective memories, namely a memory 932 and a memory 934, which may be portions of main memory locally attached to the respective processors.

First processing element 970 and second processing element 980 may be coupled to I/O control logic 990 via P-P interconnects 952 and 954, respectively. As shown in FIG. 9, I/O control logic 990 may include P-P interfaces 994 and 998. Furthermore, I/O control logic 990 includes an interface 992 to couple I/O control logic 990 with a high performance graphics engine 938. In one embodiment, bus 939 may be used to couple graphics engine 938 to I/O control logic 990. Alternately, a point-to-point interconnect 939 may couple these components.

In turn, I/O control logic 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the appended claims are not so limited.

As shown in FIG. 9, various I/O devices 914 may be coupled to first bus 916, along with a bus bridge 918 which couples first bus 916 to a second bus 910. In one embodiment, second bus 910 may be a low pin count (LPC) bus. Various devices may be coupled to second bus 910 including, for example, a keyboard and/or mouse 912, communication devices 916 and a data storage unit 918 such as a disk drive or other mass storage device which may include code 930, in one embodiment. The code 930 may include instructions for performing embodiments of one or more of the methods described above. Further, an audio I/O 914 may be coupled to second bus 910. Note that other architectures are possible. For example, instead of the point-to-point architecture of FIG. 9, a system may implement a multi-drop bus or another such architecture.

Figure 10:
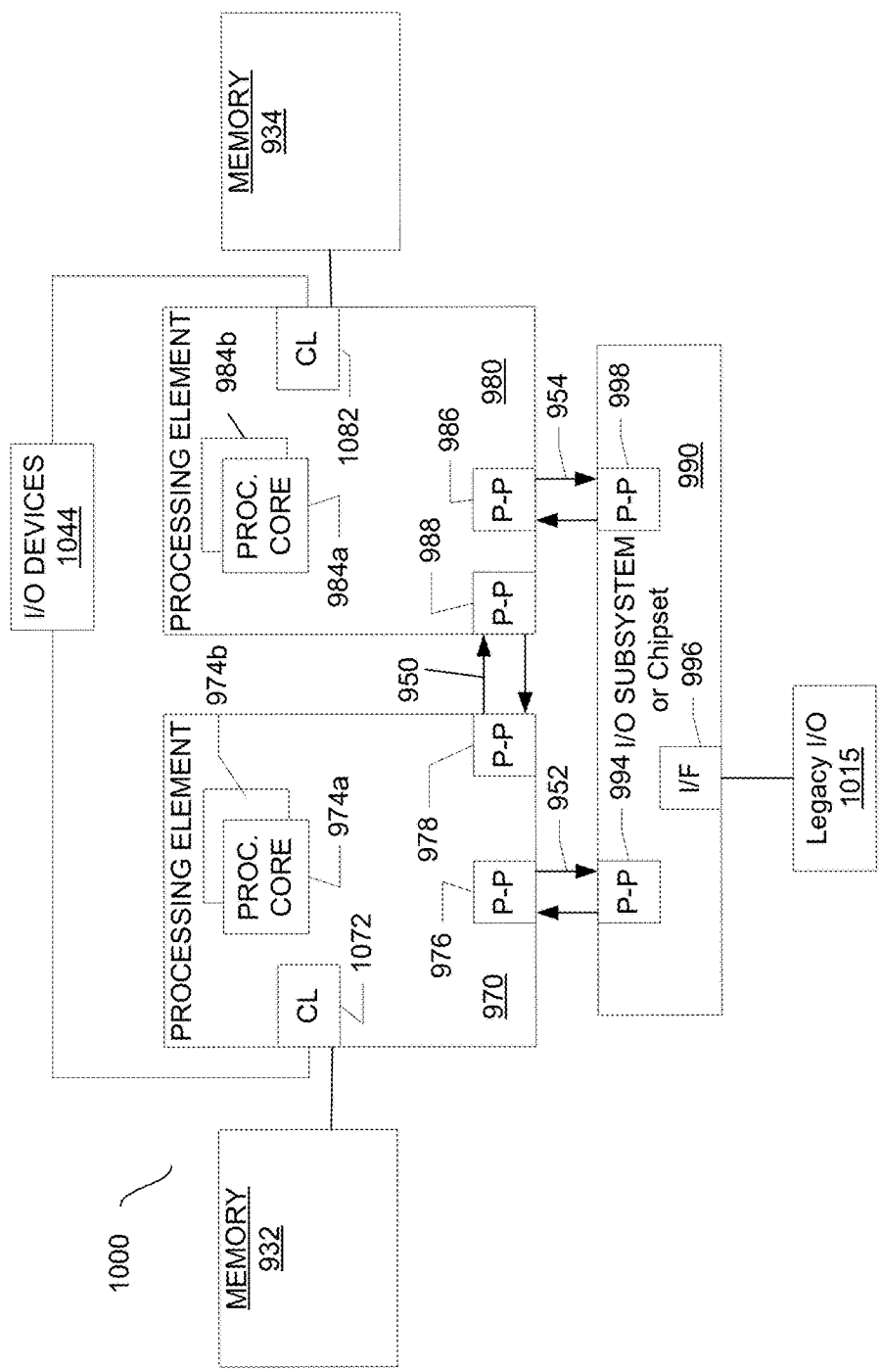
FIG. 10 is a block diagram of a system in accordance with at least one other embodiment of the present invention.

Referring now to FIG. 10, shown is a block diagram of a fourth system embodiment 1000 in accordance with an embodiment of the present invention. Like elements in FIGS. 9 and 10 bear like reference numerals and certain aspects of FIG. 9 have been omitted from FIG. 10 in order to avoid obscuring other aspects of FIG. 10.

FIG. 10 illustrates that the processing elements 970, 980 may include integrated memory and I/O control logic ("CL") 1072 and 1082, respectively. For at least one embodiment, the CL 1072, 1082 may include memory controller logic. In addition. CL 1072, 1082 may also include I/O control logic. FIG. 10 illustrates that not only are the memories 932, 934 coupled to the CL 1072, 1082, but also that I/O devices 1044 may also be coupled to the control logic 1072, 1082. Legacy I/O devices 1015 may be coupled to the I/O subsystem 990 or to a chipset, if one is present.

Presented herein are embodiments of methods and systems for enhanced system boot processing that is faster to launch the OS because it does not interrogate I/O devices for possible interruption, but that also may be modified to interrogate such devices based on a user selection mechanism. While particular embodiments of the present invention have been shown and described, it will be obvious to those skilled in the art that numerous changes, variations and modifications can be made without departing from the scope of the appended claims.

Accordingly, one of skill in the art will recognize that changes and modifications can be made without departing from the present invention in its broader aspects. The appended claims are to encompass within their scope all such changes, variations, and modifications that fall within the true scope and spirit of the present invention.

The following examples pertain to embodiments in accordance with this Specification. One or more embodiments may provide a method for performing biometric authentication of boot modules during boot of the operating system for a computing system. The method may include: performing initial operations of a boot sequence in a computing system, responsive to receiving notification of a reset event; decrypting boot sequence code using a plurality of keys, wherein the plurality of keys includes at least one key generated from biometric information of a user of the computing system; responsive to the decrypting, performing additional operations of the boot sequence, wherein the additional operations include loading of operating system code into system memory of the computing system; and terminating the boot sequence without loading the operating system code if the decrypting is unsuccessful.

In an example of one or more embodiments, the boot sequence may be a UEFI boot sequence. For such embodiments, the decrypting is performed during a driver execution environment phase of the UEFI boot sequence. The decrypting for such embodiments may further comprise decrypting of UEFI driver code.

In an example of one or more embodiments, the initial operations of the boot sequence include one or more operations to initialize a processor of the computing system.

In an example of one or more embodiments, the method may further include initializing one or more biometric devices. The method may further include collecting the biometric information from one or more biometric devices.

In an example of one or more embodiments, the plurality of keys further includes at least one key generated from information unique to the computing system.

One or more embodiments may provide at least one machine-accessible storage medium comprising one or more instructions that when executed by a processor cause a computing device to: receive notification of a reset event; receive, from one or more biometric device, biometric information associated with a user; encrypt instructions, to be executed during a boot sequence, based on said biometric information; and perform additional processing to load the operating system; wherein said encrypting is further based on a unique identifier associated with the computing device and is to be performed prior to loading of an operating system.

For at least one such embodiment, the encrypting is to be performed during a driver execution environment phase of a UEFI boot sequence.

For at least one other such embodiment, encrypting is to be further based on one or more additional data associated with the user. The one or more additional data further comprises one or more of: (a) possession of a token, (b) password, (c) passphrase, and (d) location of the user.

In another example of one or more embodiments of the at least one computer-readable medium, one or more additional instructions when executed cause the computing device to: perform one or more platform initialization instructions; and initialize the one or more biometric devices.

One or more embodiments may provide at least one other machine-accessible storage medium comprising one or more instructions that when executed by a processor cause a computing device to: receive notification of a reset event; receive, from one or more biometric device, biometric information associated with a user; decrypt instructions, to be executed during a boot sequence, based on said biometric information; and perform additional processing to load the operating system; wherein said decrypting is to be further based on a unique identifier associated with the computing device and is to be performed prior to loading of an operating system.

In another example of one or more embodiments of the at least one other computer-readable medium, one or more additional instructions when executed cause the computing device to: perform one or more platform initialization instructions; and initialize the one or more biometric devices.

For at least one such embodiment, the encrypting is to be performed during a driver execution environment phase of a UEFI boot sequence.

For at least one other such embodiment, encrypting is to be further based on one or more additional data associated with the user. The one or more additional data further comprises one or more of: (a) possession of a token, (b) password, (c) passphrase, and (d) location of the user.

One or more embodiments may provide a system that is to perform biometric authentication of boot modules. An example of such an embodiment includes a processor; a non-volatile memory coupled to the processor; and a system memory coupled to the processor; wherein said non-volatile memory includes one or more instructions for: generating a first key, based on biometric information of a user; authenticating instructions stored in the non-volatile memory; and loading the authenticated instructions from the non-volatile memory into the volatile memory; wherein said authenticating is based on the first key and a unique identifier associated with the system.

For at least one such example system embodiment, said authenticated instructions are instructions to be executed prior to loading of operating system code into the system memory.

For at least one other such example system embodiment, said unique identifier is a serial number associated with the system.

For at least one other such example system embodiment, said unique identifier is a trusted platform module key.

For at least one other such example system embodiment, said biometric information is a fingerprint.

For at least one other such example system embodiment, said biometric information is an image of the user's face.

For at least one other such example system embodiment, said authenticated instructions further comprise instructions associated with one or more drivers. For at least one such embodiment, said instructions stored in non-volatile memory further comprise instructions associated with one or more UEFI drivers.

For at least one other such example system embodiment, said non-volatile memory includes one or more instructions for generating a second key, based on the unique identifier.

For at least one other such example system embodiment, the system of claim 11, wherein said decrypting is to be further based on additional data associated with the user.

For at least one such embodiment, said additional data associated with the user further comprises a password. For at least one such embodiment, said additional data associated with the user further comprises a passphrase. For at least one such embodiment, said additional data associated with the user further comprises user location information.

What is claimed is:

1. At least one non-transitory machine accessible storage medium including one or more sequences of instructions, the sequences of instructions including instructions which when executed cause a computing device to:
   receive notification of a reset event;
   receive, from one or more biometric devices, biometric information associated with a user;
   store the biometric information associated with the user as digitized biometric information, wherein the biometric information comprises multiple readings from one or more biometric devices;
   generate a personal key by generating a hash value based on the digitized biometric information including the multiple readings;
   encrypt firmware instructions to be executed during a boot sequence, said encrypting using the personal key and a unique identifier associated with the computing device, the unique identifier including at least one of a product serial number, a media access control (MAC) address of an Ethernet device, or Trusted Platform Module (TPM) key; and
   perform additional processing to load the operating system;
   wherein said encrypting is to be performed prior to loading of an operating system during a driver execution environment phase of a UEFI boot sequence, and wherein said encrypting is to be based on one or more of: (a) possession of a token, (b) password, (c) passphrase, and (d) location of the user.

2. The storage medium of claim 1, the instructions further comprising instructions which when executed cause the computing device to:
   perform one or more platform initialization instructions, and
   initialize the one or more biometric devices.

3. The storage medium of claim 1, wherein said encrypting is to be further based on one or more additional data associated with the user.

4. At least one non-transitory machine accessible storage medium including one or more sequences of instructions, the sequences of instructions including instructions which when executed cause a computing device to:
   receive notification of a reset event;
   receive, from one or more biometric devices, biometric information associated with a user, wherein the biometric information comprises multiple readings from the one or more biometric devices;
   store the biometric information associated with the user as digitized biometric information;
   generate a personal key by generating a hash value based on the digitized biometric information including the multiple readings;
   decrypt firmware instructions to be executed during a boot sequence, said decrypting based on the personal key, including said biometric information, and a unique identifier associated with the computing device, the unique identifier including at least one of a product serial number, a media access control (MAC) address of an Ethernet device, or Trusted Platform Module (TPM) key; and
   perform additional processing to load the operating system;
   wherein said decrypting is to be performed prior to loading of an operating system during a pre-EFI initialization phase of a UEFI boot sequence, and wherein said decrypting is based on one or more of: (a) possession of a token, (b) password, (c) passphrase, and (d) location of the user.

5. The storage medium of claim 4, the instructions further comprising instructions which when executed cause the computing device to:
   perform one or more platform initialization instructions, and
   initialize the one or more biometric devices.

6. The storage medium of claim 4, wherein said decrypting is further based on one or more additional data associated with the user.

7. A method, comprising:
   performing initial operations of a boot sequence in a computing system, responsive to receiving notification of a reset event;
   decrypting boot sequence firmware code using a plurality of decryption keys, wherein:
     the plurality of decryption keys includes at least one key generated by generating a hash value based on digitized biometric information of a user of the computing system and at least one key generated by generating a hash value based on information unique to the computing system, the information including at least one of a product serial number, a media access control (MAC) address of an Ethernet device, or Trusted Platform Module (TPM) key,
     the biometric information comprises multiple readings from one or more biometric devices;
   responsive to the decrypting, performing additional operations of the boot sequence, wherein the additional operations include loading of operating system code into system memory of the computing system; and terminating the boot sequence without loading the operating system code if the decrypting is unsuccessful, wherein said decrypting is performed during a driver execution environment phase of the UEFI boot sequence, and wherein said decrypting is based on one or more of: (a) possession of a token, (b) password, (c) passphrase, and (d) location of the user.

8. The method of claim 7, wherein the boot sequence is a UEFI boot sequence.

9. The method of claim 8, wherein the decrypting of boot sequence firmware code further comprises decrypting of UEFI driver code.

10. The method of claim 7, wherein said initial operations of the boot sequence include one or more operations to initialize a processor of the computing system.

11. The method of claim 7, further comprising: initializing one or more biometric devices.

12. The method of claim 7, further comprising: collecting the biometric information from one or more biometric devices.

* * * * *